US009216550B2

(12) United States Patent
Hill et al.

(10) Patent No.: US 9,216,550 B2
(45) Date of Patent: Dec. 22, 2015

(54) PROCESS FOR MANUFACTURING A FUEL TANK

(75) Inventors: David Hill, Commerce Township, MI (US); James Edward Thompson, Novi, MI (US); Bjorn Criel, Sint-Martens-Lennik (BE)

(73) Assignee: INERGY AUTOMOTIVE SYSTEMS RESEARCH (Societe Anonyme), Brussels (BE)

( * ) Notice: Subject to any disclaimer, the term of this patent is extended or adjusted under 35 U.S.C. 154(b) by 80 days.

(21) Appl. No.: 13/983,067

(22) PCT Filed: Jan. 26, 2012

(86) PCT No.: PCT/EP2012/051240
§ 371 (c)(1),
(2), (4) Date: Oct. 15, 2013

(87) PCT Pub. No.: WO2012/104197
PCT Pub. Date: Aug. 9, 2012

(65) Prior Publication Data
US 2014/0027958 A1 Jan. 30, 2014

Related U.S. Application Data

(60) Provisional application No. 61/438,792, filed on Feb. 2, 2011.

(30) Foreign Application Priority Data

May 27, 2011 (EP) .................................. 11167945

(51) Int. Cl.
*B29D 22/00* (2006.01)
*B29C 51/12* (2006.01)
(Continued)

(52) U.S. Cl.
CPC .............. *B29D 22/003* (2013.01); *B29C 49/04* (2013.01); *B29C 49/4252* (2013.01);
(Continued)

(58) Field of Classification Search
None
See application file for complete search history.

(56) References Cited

U.S. PATENT DOCUMENTS 5,445,783 A 8/1995 Irish et al.
8,496,867 B2 * 7/2013 Criel et al. .................... 264/516
(Continued)

FOREIGN PATENT DOCUMENTS

DE 10 2009 030 492 1/2011
EP 1 110 697 6/2001
(Continued)

OTHER PUBLICATIONS

International Search Report Issued Feb. 29, 2012 in PCT/EP12/051240 Filed Jan. 26, 2012.
(Continued)

*Primary Examiner* — Monica Huson
(74) *Attorney, Agent, or Firm* — Oblon, McClelland, Maier & Neustadt, L.L.P.

(57) ABSTRACT

A process for manufacturing a plastic fuel tank including at least one component, by molding a parison using a mold including two impressions and a core, the process including: introducing a parison into the mold impressions; introducing a core inside the parison, the core having a moving device including the at least one component closing the mold so that the impressions come into leaktight contact with the core; pressing the parison against the impressions by blowing through the core and/or applying a vacuum behind the impressions; fastening the at least one component on an inner wall of the parison; opening the mold to withdraw the core; and final molding the parison by blow-molding and/or thermoforming; and to enable its fastening to the parison, the component is moved away from the core by the moving device through a combination of a rotational motion and a linear motion.

6 Claims, 2 Drawing Sheets

Figure 1:
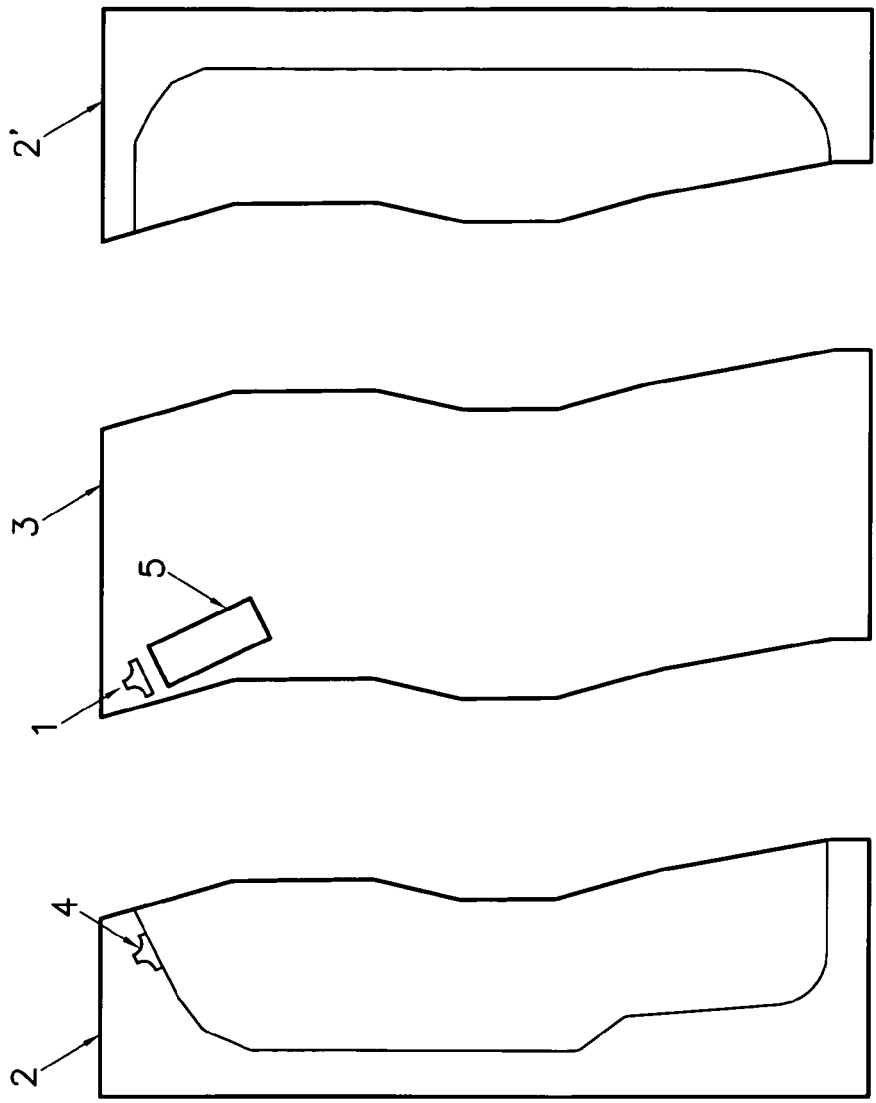

(51) Int. Cl.
    *B29C 49/04* (2006.01)
    *B29C 49/42* (2006.01)
    *B29C 51/26* (2006.01)
    *B29L 31/00* (2006.01)
    *B29C 49/20* (2006.01)

(52) U.S. Cl.
    CPC .............. *B29C 51/12* (2013.01); *B29C 51/267* (2013.01); *B29C 2049/2073* (2013.01); *B29C 2791/006* (2013.01); *B29C 2791/007* (2013.01); *B29C 2793/0081* (2013.01); *B29L 2031/7172* (2013.01)

(56) References Cited

U.S. PATENT DOCUMENTS

| | | | | |
|---|---|---|---|---|
| 8,658,079 | B2 * | 2/2014 | Criel et al. | 264/526 |
| 2001/0013516 | A1 * | 8/2001 | Boecker | 220/562 |
| 2001/0015513 | A1 * | 8/2001 | Schaftingen et al. | 264/515 |
| 2005/0205156 | A1 | 9/2005 | Ganachaud et al. | |
| 2011/0140314 | A1 * | 6/2011 | Grauer | 264/516 |
| 2011/0266723 | A1 | 11/2011 | Criel et al. | |

FOREIGN PATENT DOCUMENTS

| | | |
|---|---|---|
| GB | 2 101 520 | 1/1983 |
| GB | 2 279 606 | 1/1995 |
| JP | 4 91923 | 3/1992 |
| WO | 2004 024487 | 3/2004 |

OTHER PUBLICATIONS

European Search Report issued Feb. 14, 2012 in EP 11 16 7945 Filed May 27, 2011.

* cited by examiner

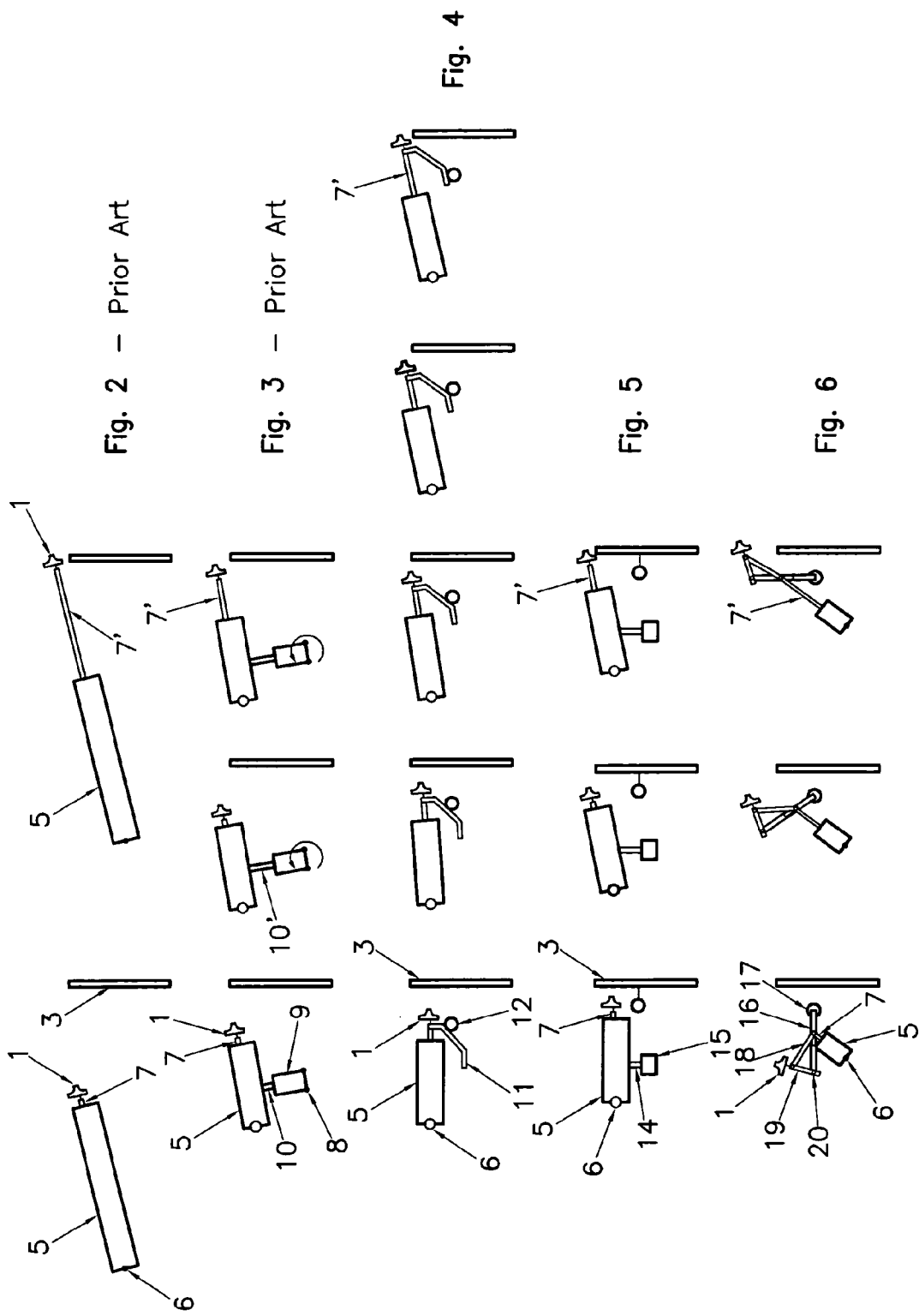

PROCESS FOR MANUFACTURING A FUEL TANK

INTRODUCTION

The present invention relates to a process and device for manufacturing a plastic fuel tank equipped with a component.

PRIOR ART

Fuel tanks on board vehicles of various kinds generally have to meet sealing and permeability standards in relation to the type of use for which they are designed and the environmental requirements that they have to satisfy. At the present time, both in Europe and throughout the world, there is a substantial tightening of the requirements regarding the limitation of pollutant emissions into the atmosphere and into the environment in general.

To limit these emissions, care is taken in particular to position the components (ventilation lines, valves, baffles, stiffeners, etc.) inside the tank and/or the fill pipe (see in particular application WO 2004/024487 in the name of the Applicant). However, when these elements are fastened to the tank after it has been moulded, it is generally necessary to make at least one opening in the tank so as to be able to introduce these elements into the tank and to fasten them thereto. Hence there may be potential sealing and permeability problems near this opening. The leaktight closure between an element and the tank is conventionally achieved with the aid of the compression of a seal, which seal is however a significant source of permeability. Furthermore, this type of closure is generally performed manually on the production line, which creates labour costs and may generate scrap due to human error.

Several years ago the Applicant therefore developed a process of initially moulding a cut parison (a tubular flow of molten plastic cut into 2 sections which are flattened i.e. transformed into sheets) in order to be able to introduce there into and fasten thereto components during the actual moulding of the tank and to thus avoid piercing openings (see patent EP 1 110 697 in the name of the Applicant).

This process has since been the subject of several improvements targeting particular means for fastening these components: see in particular applications WO 2006/008308 (fastening of components by rivet punching), WO 2006/095024 (fastening of ventilation lines that have a part that can be deformed due to the presence of a bend that is stretched during the attachment of these lines to the parison), WO 2007/000454 (fastening of components according to an ideal layout and in particular, as regards the ventilation lines, while avoiding the formation of siphons) and WO 2010/081853 (fixation of least one communication component intended to communicate with the outside of the tank).

These improvements were possible thanks to the use of a core or intermediate frame, i.e. a part of suitable size and shape for being able to be inserted between the impressions of the mould when the parison is located therein and to fasten thereto the components inside the tank without the edges of the parison being welded (since the core must be removed before the final moulding of the tank, a step during which the welding of the parison sections is carried out). Such a part (core) is, for example, described in patent GB 1 410 215, the content of which is for this purpose incorporated by reference into the present application.

A process using such a core generally comprises the following steps:
1. Two molten sheets are placed between two mould halves and an intermediate frame with the same contour as the two mould halves.
2. The mould halves are closed on the intermediate frame.
3. Differential pressure is applied such that the contour of the tank is formed.
4. Components are fusion welded or mechanically locked to the inside of the tank.
5. The mould halves open.
6. The intermediate frame is removed
7. The mould halves close to form a finished part.

Due to the closeness of the material to the intermediate frame between steps 2 and 3, the components inserted in step 4 must be below the contour of the mould (and hence, below the surface of the intermediate frame), as to avoid premature contact to the molten sheets.

For the use of components mounted in the same axis of motion as the mold opening and closing, the process is rather simple, and can be achieved using 1 axis of motion. And as a matter of fact, in the above mentioned WO 2010/081853 application, the movement described for fixing the communication component is essentially linear.

In the event that the component is not inserted in this direction, the problem becomes more difficult, as the axis of insertion does little to recess the component below the contour of the mould on the intermediate frame, within the minimum required stroke for inserting the component.

The first solution is to use a sufficiently long actuator (which is mounted inclined), to ensure that in the retracted position, the component lies below the contour of the intermediate frame. This solution is undesirable, as it makes it difficult to insert this apparatus into the intermediate frame without interfering with the space for other actuators to install other components to the interior of the body, as well as interfering with structural members for withstanding the pressure inside the intermediate frame during the forming of the halves via differential pressure.

Another solution is to create two linear paths of motion. 1 motion would act to recess the component below the contour of the mould, in the axis of mould opening, and the second would act to insert the component in an axis different to this, as is described in US 2009/0308881. In this document, the device used for fixing a component inside the parison still in molten state comprises pneumatic cylinders which can impart a linear movement to the component (or part of it) essentially in two perpendicular directions (x-axis and z-axis). This solution is also undesirable for the following reasons:
1. Two actuations are required, and thus two control systems and actuators. As a result, the possibility for failures is increased 100%.
2. When the first actuator is actuated, it creates by definition a lever arm between the initial retracted position of the first actuator and the extended position of the actuator. This lever arm decreases the possible load that can be applied using the second actuator, for a given bracket design, as there is now both shear and axial load.
3. As can be seen from the drawings of US' 881, the size of the actuation devices is such that the core is rather bulky. Since this is a hollow part (kind of frame carrying the components that must be fixed inside the parison/tank), it requires a rather long time to be filled with pressurized gas (as required for blow moulding) so that the process cycle time is increased. Not only is this economically undesirable but also, it delays the time of final closure of the mould (and welding of the 2 pre-moulded shells), leading to a bad weld quality.

OBJECT OF THE INVENTION

The main object of the present invention is to provide a process for manufacturing a fuel tank in which the installation of a component is provided but which is nevertheless rapid thanks to the fact that the core has a reduced size. This objective is achieved by a process according to claim 1.

GENERAL DESCRIPTION OF THE INVENTION CLAIMED WITH ITS MAIN ADVANTAGES

For this purpose, the invention relates to a process for manufacturing a plastic fuel tank equipped with at least one component, by moulding a parison using a mould comprising two impressions and a core, said process comprising the following steps:
  introduction of a parison into the mould impressions;
  introduction of a core inside the parison, said core having a moving device which is fitted with the at least one component;
  closure of the mould so that the impressions come into leaktight contact with the core;
  pressing of the parison against the impressions by blowing through the core and/or applying a vacuum behind the impressions;
  fastening of the at least one component on the inner wall of the parison;
  opening of the mould in order to withdraw the core; and
  final moulding of the parison by blow-moulding and/or thermoforming; according to which in order to enable its fastening to the parison, the component is moved away from the core by the moving device through a combination of a rotational motion and of a linear motion.

According to the invention, the term "fuel tank" is understood to mean an impermeable tank that can store fuel under various and varied environment and usage conditions. An example of this tank is that with which motor vehicles are fitted.

The fuel tank according to the invention is made of plastic.

One polymer that is often used is polyethylene. Excellent results have been obtained with high-density polyethylene (HDPE).

The wall of the tank may be composed of a single thermoplastic layer, or of two layers. One or more other possible additional layers may, advantageously, be composed of layers made of a material that is a barrier to liquids and/or gases. Preferably, the nature and thickness of the barrier layer are chosen so as to minimize the permeability of liquids and gases in contact with the internal surface of the tank. Preferably, this layer is based on a barrier resin, that is to say a resin that is impermeable to the fuel such as, for example, EVOH (a partially hydrolysed ethylene/vinyl acetate copolymer). Alternatively, the tank may be subjected to a surface treatment (fluorination or sulphonation) for the purpose of making it impermeable to the fuel.

The tank according to the invention preferably comprises an EVOH-based barrier layer located between the HDPE-based outer layers.

According to the invention, the tank is produced by moulding a parison. The term "parison" is understood to mean a preform, which is generally extruded and is intended to form the wall of the tank after moulding to the required shapes and dimensions. This preform does not necessarily have to be a one-part preform.

Thus, advantageously, the parison is in fact made up of two separate parts, which may be two sheets, for example. However, these parts preferably result from cutting one and the same extruded tubular parison as described in the aforementioned application EP 1 110 697, the content of which is, for this purpose, incorporated by reference in the present application. According to this variant, once a single parison has been extruded, this parison is, for example, cut over its entire length, along two diametrically opposed lines, to obtain two separate parts (sheets).

By comparison with the moulding of two separately extruded sheets, the thickness of which is constant, this approach makes it possible to use parisons of varying thickness (that is to say in which the thickness is not constant along their length), obtained using a suitable extruding device (generally an extruder equipped with a die and a punch, the position of which is adjustable). Such a parison takes account of the reduction in thickness that occurs during moulding at certain points on the parison, as a result of non-constant levels of deformation of the material in the mould.

After a parison has been moulded in two parts, these parts generally form the lower and upper walls respectively of the fuel tank, each having an inner surface (pointed towards the inside of the tank) and an outer surface (pointed towards the outside of the tank).

The mould used in the process according to the invention comprises a core as defined previously and two impressions that are intended to be in contact with the outer surface of the parison, the parison being moulded by blow-moulding (pressing the parison against these impressions using a pressurized gas injected into the parison) and/or by thermoforming (drawing a vacuum behind the mould impressions).

The "moving device" according to the invention generally comprises at least one actuator (electromagnetic, hydraulic, pneumatic . . . ) and it is able to impart to the component, a combination of a rotational movement and a linear movement. This may be achieved through the combination of a rotary-actuator and a linear actuator, or by a single linear actuator interacting with at least one mechanical part so as to alter the linear stroke of the actuator. This part can be a cam, two arms with two pivot points . . . .

According to the invention, "combination" means that the rotational and the linear movement may happen at the same time or they may happen the one after the other. In that case, generally, rotation happens before linear motion. Preferably, in order to be able to achieve a precise fixation, the end of the motion preferably is substantially linear and perpendicular to the part of the tank wall where the component must be fixed.

Devices that give good results in practice are rotating cylindrical pneumatic devices. Such devices are readily available commercially namely at the company FESTO.

At least one result achieved by the invention is the ability to package additional actuators and components into a given intermediate frame, that were not possible using the prior art solutions. This is a major advantage, particularly in the fuel systems market where the trend is to install large, noise mitigating baffles inside a reservoir, which take up substantial amounts of space within the intermediate frame. More specifically it allows the inventor to properly implement the solution described in the invention of the above mentioned application WO 2010/081853.

The main advantages of the invention are:
  1. Decreased amount of space for packaging an actuator to install a component.
  2. Minimal moment arm on the mechanism during the installation process.
  3. Ability to package other components in close proximity to the apparatus, as components of the apparatus only temporarily occupy space within the intermediate frame during the insertion process.

DESCRIPTION WITH THE AID OF THE FIGURES

Other particular aspects and features of the invention will become apparent from the description of a few advantageous embodiments presented below, by way of illustration, with reference to the appended drawings which show:

FIG. 1: a schematic cross-sectional view through a mould for moulding a fuel tank using a process according to a first embodiment of the invention;

FIG. 2: a schematic view of a moving device according to a first embodiment of the prior art;

FIG. 3: a schematic view of a moving device according to a second embodiment of the prior art;

FIG. 4: a schematic view of a moving device according to a first embodiment of the invention;

FIG. 5: a schematic view of a moving device according to a second embodiment of invention;

FIG. 6: a schematic view of a moving device according to a third embodiment of the invention.

The base cycles of the process according to the invention are, for example, described in application EP 1 110 697, the content of which is for this purpose introduced by reference into the present application.

FIG. 1 describes briefly the major components involved in the molding methodology described in previous paragraphs. In order to form a hollow body with components affixed to the inner walls, an intermediate frame (3) is closed upon by two mould cavities (2-2') to constrain two flat sheets of molten plastic, and form them into an upper and lower half of a reservoir. Immediately after forming, actuators, preferably either hydraulic, pneumatic or electrical (5) are used to insert a component (1) for example into the wall of the tank shell and affix it to the tank wall via a mechanical lock or fusion welding. In one embodiment this component (1) mates with a matching cavity (4) in the mould. The depth of this cavity is one of the variables that can influence the proper stroke length.

FIG. 2 describes a first embodiment of the prior art used to insert a component (1) into the interior of said reservoir. In this embodiment, an actuator is fixed within the walls of the intermediate frame (3). A particular stroke length defined as the distance between 7 and 7', is required to ensure that prior to the forming of the reservoir, the component (1) is recessed below the wall of the intermediate frame (3) to ensure there is no premature contact between the molten plastic and the component. In this design, because the actuator (5) is completely fixed, the stoke length needs to be substantially large, which will likely interfere with other internal components that would possibly be placed by the intermediate frame (3).

FIG. 3 describes a second embodiment according to the prior art, in which the actuator (5) is manipulated as a whole in an axis other than that of the line created by stroke length (7-7') The manipulation is performed preferably via a second actuator (9) with a stroke length and axis defined by 10 and 10'. When the actuator (9) is extended and then actuator (5) is extended, the resulting force created by the interference between the component (1) and the interior wall of the reservoir, creates an undesirable moment about the mounting point (8) of the second actuator (9). As a result additional reinforcement is needed to manage this increased load, resulting in a mechanism that is not optimized for space, and will likely interfere with other components internal to the intermediate frame.

FIG. 4 describes a first preferred embodiment of the disclosed invention. In figure four, the trajectory of the stroke defined as the 7-7' is altered via cam (11) that is mounted to the moving end of the actuator (5) that interfaces with a roller (12) that is fixed to the intermediate frame. It should be noted that the opposite configuration, although not pictured is a possible embodiment as well. As the actuator extends from retracted position (7) to extended position (7') the fixed roller (12) causes the actuator to pivot about an axis (6), as a result of the cam's (11) profile. At a certain moment, the component (1) held by the actuator (5) is completely above the wall of the intermediate frame (3). At this point in the stroke (7 to 7') the cam no longer forces the actuator to pivot about the axis (6) resulting in linear motion that is desired for the insertion of the component into the interior wall of the tank shell. Unlike the embodiment in FIG. 3, only 1 actuator is required, and there is no moment arm on the mechanism due to the insertion force of the component (1).

FIG. 5 describes an improvement on the embodiment described in FIG. 3. In FIG. 5, a secondary actuator (15) is used to force the actuator (5) to rotate about the axis (6) to change the trajectory of the axis defined by 7-7' to allow the component (1) to clear the wall of the intermediate frame (3). The result is an actuator (5) with very short stroke (7-7'), which minimizes the amount of space required inside the intermediate frame, while ensuring that the force of the insertion of the component (1) into the tank wall is exerted directly on the axis (6).

FIG. 6 describes another embodiment of the invention in which the combination of the motion path created by arm 16 pivoting about axis 17 and arm 18 pivoting sliding within arm 16 and pivoting about the end of the actuator rod (22). As the endpoint of the actuator rod (22) travels between retracted (7) and extended (7') limits. A complex motion path is created. As a result as the actuator approaches the extended position (7') the trajectory of the component (1) becomes substantially linear, and the axis of movement of the actuator (5) and the component (1) become closer to parallel, resulting in decreased moment on arm (16), and thus less requirement to add material to the arm (16), and thus compact packaging of the actuator. One additional advantage to this design is that there is free space to the left of the actuator (5) and below the arm (16) when the actuator is in retracted position (7). This is an advantage over similar designs because components can be nested in this space, and still be inserted into the wall of the tank, after the actuator (5) has manipulated the mechanism partially between retracted (7) and extended (7') positions.

It is clear from FIGS. 2 to 6 that the space occupied by the actuator and the component inside the intermediate frame is the highest in FIG. 2, already less in FIG. 3 (but with the drawback of the moment explained above), still less and about the same in FIGS. 4 and 5, and the least in FIG. 6.

The invention claimed is:

1. A process for manufacturing a plastic fuel tank including at least one component, by molding a parison using a mold including two impressions and a core, the process comprising:
    introducing the parison into the mold impressions;
    introducing the core inside the parison, the core including a moving device fitted with the at least one component;
    closing the mold so that the impressions come into leak-tight contact with the core;
    pressing the parison against the impressions by blowing through the core and/or applying a vacuum behind the impressions;
    fastening the at least one component on an inner wall of the parison;
    opening the mold;

withdrawing the core from inside the parison; and finally molding the parison by blow-molding and/or thermoforming;

wherein to enable its fastening to the parison, the component is moved away from the core by the moving device through a combination of a rotational motion and a linear motion.

2. A process according to claim 1, wherein the component is a communication component configured to communicate with an outside of the tank.

3. A process according to claim 1, wherein the parison includes two separate parts, which result from cutting one extruded tubular parison over its entire length, along two diametrically opposed lines, to obtain the two separate parts.

4. A process according to claim 1, using a combination of a rotary actuator and a linear actuator, or a single linear actuator interacting with at least one mechanical part so as to alter a linear stroke of the actuator.

5. A process according to claim 4, wherein the mechanical part comprises a cam or two arms with two pivot points.

6. A process according to claim 1, wherein an end of the motion is substantially linear and perpendicular to a part of a tank wall where the component is to be fixed.

* * * * *